United States Patent Office 3,287,265
Patented Nov. 22, 1966

3,287,265
LUBRICATING OIL AND ADDITIVE
Warren L. Perilstein, Orchard Lake, Mich., assignor, by mesne assignments, to International Lead Zinc Research Organization, Inc., New York, N.Y., a corporation of New York
No Drawing. Filed Apr. 1, 1963, Ser. No. 269,786
7 Claims. (Cl. 252—42.7)

The present invention relates to improved mineral lubricating oil additives in the form of organolead compounds. Such compounds may be described as substituted tetravalent lead compounds in which the substituent groups attached to the lead atom are phenyl radicals (either 2 or 3), and in which the groups attached to the sulfur atom and through the sulfur atom to the lead atom, are aliphatic, alkoyl, aroyl, or aromatic.

In general, the new additives may be chosen from those represented $Ph_nPb(SR)_{4-n}$, where Ph is a phenyl group, and R is a member of an aliphatic, alkoyl, aroyl or aromatic group, and $n$ is either 2 or 3.

The reaction for producing these compounds may be represented as follows:

$(n-1)Ph_nPbCl_{4-n} + Pb(SR)_2$
$\rightarrow (n-1)Ph_nPb(SR)_{4-n} + PbCl_2$

The compounds $Pb(SR)_2$ may first be formed by the known reaction $2RSH + Pb(OAc)_2 \rightarrow Pb(SR)_2 + 2HOAc$.

Thus two molar equivalents of the respective mercaptan or thioacid dissolved in alcohol were dropped slowly into a refluxing 50% alcoholic solution containing one molar equivalent of lead (II) acetate. An almost immediate precipitation of the yellow lead (II) mercaptide or lead (II) salt of the thioacid takes place.

Since the additive compounds are new, it is desired first to indicate methods for making same, after which examples of the use of said compounds as additives will be given.

EXAMPLE I (a) *The preparation of thiomethyl triphenyllead*

Stoichiometric amounts of triphenyllead chloride and lead (II) methyl mercaptide were refluxed in benzene for three hours. During this time the lead (II) methyl mercaptide was converted into white lead (II) chloride, $2(C_6H_5)_3PbCl + Pb(SCH_3)_2 \rightarrow 2(C_6H_5)_3PbSCH_3 + PbCl_2$ The lead chloride was filtered off, the benzene evaporated, and the remaining residue of $(C_6H_5)_3PbSCH_3$, melting point 106–108° C. (yield: quantitative) recrystallized from hexane, M.P. of pure compound 108–109° C. Mixed

TABLE I

| Formula | Compound | Melting Point, ° C. |
|---|---|---|
| 1. $(C_6H_5)_3PbSCH_3$ | Thiomethyl triphenyllead | 108–109 |
| 2. $(C_6H_5)_3PbSC_2H_5$ | Thioethyl triphenyllead | 67–68 |
| 3. $(C_6H_5)_3PbSC_3H_7$ | Thiopropyl triphenyllead | 57–58 |
| 4. $(C_6H_5)_3PbSC_4H_9$ | Thiobutyl triphenyllead | Decomposed at B.P. |
| 5. $(C_6H_5)_3PbSCH_2C_6H_5$ | Thiobenzyl triphenyllead | 82–83 |
| 6. $(C_6H_5)_3PbSC_6H_5$ | Thiophenyl triphenyllead | 106–107 |
| 7. $(C_6H_5)_3PbS\overset{O}{\overset{\|}{C}}CH_3$ | Thioacetyl triphenyllead | 92–93 |
| 8. $(C_6H_5)_3PbS\overset{O}{\overset{\|}{C}}C_6H_5$ | Thiobenzoyl triphenyllead | 93–94 |
| 9. 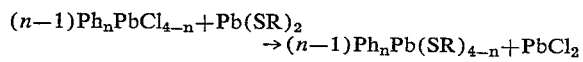 | Thionaphthyl triphenyllead | 73–75 |
| 10. $(C_6H_5)_3PbSCH_2\overset{O}{\overset{\|}{C}}OCH_3$ | Thiomethylcarbomethoxy triphenyllead. | 85 |
| 11. 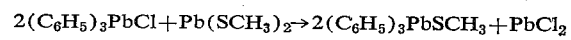 | Thiobenzthiazolyl triphenyllead | 58 |
| 12.  | Dithiobenzthiazolyl diphenyllead | 152–153 |
| 13. 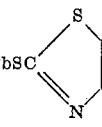 | Thiobenzoxazoyl triphenyllead | 65 |
| 14. $(C_6H_5)_3PbS(CH_2)_9CH_3$ | Thiodecyl triphenyllead | Decomposed at B.P. |
| 15. $(C_6H_5)_2Pb(SCOCH_3)_2$ | Bisthioacetyl diphenyllead | | melting points with admixture of a known sample gave no depression.

By starting with the corresponding lead (II) ethyl mercaptide, the compound thioethyl triphenyllead may be prepared following the procedure of Example I(a).

(b) *The preparation of thio n-propyl triphenyllead* n-Propyl lead (II) mercaptide was first prepared as given above, i.e., from stoichiometric amounts of the corresponding thiol and lead acetate in 50% aqueous alcohol, and after washing the so-formed salt with water, it was dried in a vacuum desiccator.

Triphenyllead chloride, 4.86 g. (10 mmoles), and lead (II) n-propyl mercaptide, 1.79 g. (5 mmoles), in 100 ml. benzene were refluxed with stirring for three hours. During this time the yellow mercaptide was converted into white lead chloride which was filtered off at the end of the reaction period. The filtrate was evaporated and the residue recrystallized from ethanol, yield 4.84 g. (95%), M.P. 57–58° C.

The above described new compounds are white, or slightly colored crystalline compounds, with the exception of the liquid butyl and decyl compounds. The former, the solid compounds, decompose above the melting point to a dark brown material. The liquid compounds decompose at their boiling point. All are readily soluble in benzene, n-hexane, alcohol, chloroform, and most of the other common organic solvents. The infrared absorption spectra of all compounds show, besides the usual absorptions associated with aromatic compounds and the respective group attached to the sulfur, the band at 1052 cm.$^{-1}$, typical for organolead compounds.

EXAMPLE 2

(a) *The preparation of bis-thioacetyl diphenyllead*

Stoichiometric quantities of diphenyllead dichloride and lead (II) thioacetate were suspended in toluene, and the mixture refluxed for four hours. The reaction follows that above given, viz:

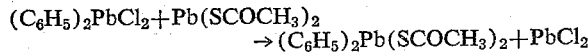

the compound obtained, bis-thioacetyl diphenyllead having a cream color, was in 81% yield.

Other diphenyl, disubstituted lead mercaptides were produced in a similar manner.

(b) *Preparation of thioacetyl triphenyllead*

This compound was prepared in exactly the same manner as set forth in Example 2(a) above, using triphenyllead chloride instead of the diphenyl compound. Its melting point is set forth in Table I, item 7.

The other aliphatic compounds, numbers 4 and 14, Table I, were prepared following Example 1; the thiomethylcarbomethoxy compound, number 10, Table I, was prepared similarly to Example 2. Since the other compounds listed in Table I were prepared using stoichiometric quantities of the reactants, it is not necessary to restate the method in respect of each.

In testing the value of the new compounds as mineral lubricating oil additives, wear experiments were run in the Shell four-ball wear tester, which is widely used for measuring the wear-prevention qualities of lubricants under boundary conditions. The device rotates a one-half inch metal ball under a specified load against three similar balls clamped together in an equilateral triangle. These balls are contained in a heated cup filled with the lubricant. The bulk temperature of the lubricant is measured by a thermocouple inserted in a thermowell in the cup. Torque on the lower ball holder is a measure of the frictional resistance at the rubbing surfaces, and is continuously measured by means of a strain gauge and recorder. Further details of the Shell tester may be had from Lub. Eng. 1, 35 (1945). The rubbing of the upper ball in the presence of the lubricant against the lower three, produces circular concave scars on the lower balls. With no wear, the balls will have a minimum diameter (Hertz diameter) which is the result of elastic deformation of the balls, and is determined by the modulus of elasticity of the material and the load applied. After a wear run, the three scars are measured to 0.01 mm. under a microscope, and the average diameter is a measure of the wear, and the basis for computation of the unit pressure.

The pressure in the contact zone of balls in the 4-ball test decreases greatly during the course of the test, since the load remains constant, while the area (wear scar area) supporting it, increases. With a 15 kg. load on SAE 52–100 steel balls, the Hertz diameter is approximately 0.22 mm., which corresponds to a pressure of 230,000 lbs./in.$^2$. When the scar diameter reaches 0.5 mm., the pressure has dropped to 45,000 lbs./in.$^2$.

By maintaining the bulk lubricant temperature, rotational speed, and time, constant, the performance of lubricants on the basis of time required for the contact zone pressure to decrease to a given value at a specified temperature may be evaluated.

In the tests conducted to measure the lubricating value of the lubricating oil to which the new compounds were added, the time required for the pressure to decrease to 50,000 lbs./in.$^2$ was chosen as a convenient value to use in comparing relative performance.

Table II below is illustrative of results obtained by the use of the improved compounds. In carrying out the tests, white mineral oil was used as the base, and the quantity of additives used was 1% by weight based upon the lead content. To provide a basis of comparison, the same test was run upon the compound mixed zinc dialkyl phosphorodithioate, manufactured under the trade name "Lubrizol 1060," and the results given in Table II. The concentration of Lubrizol 1060 was 4.04 weight percent.

The same test was also run with the base oil containing no additive. The time required for the contact zone pressure to decrease to 50,000 lb./in.$^2$, at a temperature of 50° C., was 18 minutes. The corresponding time at 125° C. was 11 minutes. The improvements in these times, for the same oil containing the additives, are shown in Table II.

TABLE II

| Compound | Concentration (weight percent cpd.) | Increase in Time (min.) to reach 50,000 lb./in.$^2$ | |
|---|---|---|---|
| | | At 50° C. | At 125° C. |
| Lubrizol 1060 | 4.04 | 150 | 290 |
| Thioethyl triphenyllead | 2.41 | 3,000+ | 8 |
| Thiobutyl triphenyllead | 2.53 | 900+ | 8 |
| Thiobenzyl triphenyllead | 2.70 | 3,000+ | 1 |
| Thiomethyl triphenyllead | 2.34 | 3,000+ | 3,000+ |
| Thiophenyl triphenyllead | 2.64 | 3,000+ | 19 |

I claim:

1. A hydrocarbon lubricating oil, and an additive therefor consisting of an organolead compound chosen from those represented by the formula:

$$Ph_nPb(SR)_{4-n}$$

where Ph stands for a phenyl group, R is a member of one of the groups of the class consisting of alkyl, acyl, mono- and dicyclic aryl, aralkyl, alkyl esterified carboxyalkyl, arylthiazolyl and aryloxazolyl, and $n$ is either 2 or 3, the amount of said additive being sufficient to improve the lubricating properties of said oil.

2. The lubricating oil and additive in accordance with claim 1 in which said group R is a member of the class consisting of phenyl, naphthyl, benzthiazolyl and benzoxazolyl.

3. A composition as described in claim 1 in which the additive is thiomethyl triphenyllead.

4. A composition as described in claim 1 in which the additive is thiobenzyl triphenyllead.

5. A composition as described in claim 1 in which the additive is thioethyl triphenyllead.

6. A composition as described in claim 1 in which the additive is thiophenyl triphenyllead.

7. A composition as described in claim 1 in which the additive is thiobutyl triphenyllead.

References Cited by the Examiner

UNITED STATES PATENTS

| | | | |
|---|---|---|---|
| 2,181,913 | 12/1939 | Rosen | 252—42.7 |
| 3,073,853 | 1/1963 | Ballinger | 260—437 |
| 3,073,854 | 1/1963 | Ballinger | 260—437 |

DANIEL E. WYMAN, *Primary Examiner.*

L. G. XIARHOS, *Assistant Examiner.*